United States Patent [19]

Miyazaki et al.

[11] 4,426,314

[45] Jan. 17, 1984

[54] MAGNESIUM-CONTAINING SOLID

[75] Inventors: Makoto Miyazaki; Takeshi Nomura, both of Ooi; Chihiro Imai, Yokohama; Makoto Yoda, Kawagoe, all of Japan

[73] Assignee: Toa Nenryo Kogyo Kabushiki Kaisha, Tokyo, Japan

[21] Appl. No.: 320,164

[22] Filed: Nov. 10, 1981

[30] Foreign Application Priority Data

Nov. 28, 1980 [JP] Japan ................................. 55/166735

[51] Int. Cl.$^3$ ............................. C08F 4/64; C08F 4/02
[52] U.S. Cl. ..................................... 502/169; 526/125
[58] Field of Search ...................................... 252/429 B

[56] References Cited

U.S. PATENT DOCUMENTS

| | | | |
|---|---|---|---|
| 3,381,047 | 4/1968 | Eluterio et al. | 252/429 B X |
| 3,784,481 | 1/1974 | Lassau et al. | 252/429 B X |
| 4,220,554 | 9/1980 | Scata et al. | 252/429 B |
| 4,232,139 | 11/1980 | Minami et al. | 252/429 B X |
| 4,335,015 | 6/1982 | Imai et al. | 252/429 B |
| 4,370,257 | 1/1983 | Imai et al. | 252/429 B |

OTHER PUBLICATIONS

U.S. Ser. No. 268,313 of Imai et al filed 5-29-81 for Catalyst Component for Polymerization of Alpha-Olefins and Method for Using Them.

U.S. Ser. No. 177,024 of Imai et al filed 8-11-80 for Catalyst Component for Polymerization of Alpha-Olefins and Method for Using the Same.

*Primary Examiner*—Patrick Garvin
*Attorney, Agent, or Firm*—Myron B. Kurtzman

[57] ABSTRACT

According to a first aspect of this invention, there is provided A magnesium-containing solid, obtained by contacting the reaction product of (1):

(A) metallic magnesium;
(B) a halogenated hydrocarbon of the general formula RX in which R stands for an alkyl, aryl or cycloalkyl group having 1 to 20 carbon atoms, and X stands for a halogen atom; and
(C) an alkoxy compound of the general formula $X'_m C(OR')_{4-m}$ in which X' stands for a hydrogen or halogen atom, or an alkyl, aryl or cycloalkyl group having 1 to 10 carbon atoms, R' stands for an alkyl, aryl or cycloalkyl group having 1 to 20 carbon atoms, and m is 0, 1 or 2, with (2) an electron donative compound and hydrogen halide. The supported transition metal in combination with an organoaluminum cocatalyst is employed as an olefin polymerization catalyst.

18 Claims, No Drawings

MAGNESIUM-CONTAINING SOLID

BACKGROUND OF THE INVENTION

This invention relates to a novel magnesium-containing solid which is useful as a carrier for various kinds of catalysts, particularly a catalyst for polymerization of ethylene and alpha-olefins (hereinafter referred to simply as the olefins). More particularly, it is concerned with a novel magnesium-containing solid which is useful as a carrier for the Ziegler catalyst for polymerization of olefins, and a component of an olefin polymerization catalyst comprising such a solid, particularly in the form of uniform particles.

Various kinds of substances have hitherto been proposed for use as the carrier for a Ziegler catalyst for polymerization of olefins. A solid containing magnesium is useful as a catalyst for polymerization of olefins, and particularly as a carrier for any such catalyst. Various methods have been proposed for obtaining uniform particles of a solid containing magnesium.

For example, it has been proposed to obtain spherical particles by spraying an aqueous solution of magnesium chloride, or molten $MgCl_2 \cdot 6H_2O$ as disclosed in U.S. Pat. Nos. 3,953,414 and 4,111,835 and British Pat. No. 2,006,227, or obtain appropriate particles by classifying particles of magnesium chloride powder as disclosed in Japanese Patent Application Laid-Open No. 127185/76.

For manufacturing a solid containing magnesium, it has, for example, been proposed to contact metallic magnesium, a halogenated hydrocarbon and an electron donative compound such as alcohol as disclosed in Japanese Patent Application Laid-Open No. 64586/76, or react an organic metal compound with an orthosilicic ester, or react metallic magnesium, an orthosilicic ester and an organic halide with one another as disclosed in U.S. Pat. No. 4,220,554.

None of these methods has, however, been found useful for the manufacture of a carrier for a catalyst which is fully satisfactory in all aspects of particle properties, catalytic activity and stereoregularity.

The inventors of this invention have accomplished this invention as a result of their energetic research efforts to obtain a carrier which is composed of uniform particles having a large surface area, and which provides a polymer having high degrees of activity and stereoregularity for a catalyst for polymerization of olefins.

DISCLOSURE OF THE INVENTION

According to a first aspect of this invention, there is provided a magnesium-containing solid obtained by contacting the reaction product of (1):

(A) metallic magnesium;

(B) a halogenated hydrocarbon of the general formula RX in which R stands for an alkyl, aryl or cycloalkyl group having 1 to 20 carbon atoms, and X stands for a halogen atom; and (C) an alkoxy compound of the general formula $X'_m C(OR')_{4-m}$ in which X' stands for a hydrogen or halogen atom, or an alkyl, aryl or cycloalkyl group having 1 to 10 carbon atoms, R' stands for an alkyl, aryl or cycloalkyl group having 1 to 20 carbon atoms, and m is 0, 1 or 2, with (2) an electron donative compound and hydrogen halide.

Metallic Magnesium

It is preferable to use metallic magnesium in the form of a powder or chips, though any other form may be used. Before it is used, it is desirable to wash metallic magnesium with an inert hydrocarbon, such as a saturated aliphatic, alicyclic or aromatic hydrocarbon having 6 to 8 carbon atoms, and dry it under heat in the presence of an inert gas, such as nitrogen.

Halogenated Hydrocarbon

It is preferable to use a chlorinated or brominated hydrocarbon which contains an alkyl, aryl or cycloalkyl group having 1 to 8 carbon atoms. Specific examples thereof include methyl, ethyl, isopropyl, n-butyl, n-octyl or cyclohexyl chloride or bromide, chlorobenzene, and o-chlorotoluene.

Alkoxy Compound

Examples of the alkoxy compounds of the general formula $X'_m C(OR')_{4-m}$ are listed below when m is 0, 1 and 2, respectively:

(1) Orthocarbonic acid esters of the general formula $C(OR')_4$.

More specifically, they include methyl orthocarbonate $C(OCH_3)_4$, ethyl orthocarbonate $C(OC_2H_5)_4$, propyl orthocarbonate $C(OC_3H_7)_4$, butyl orthocarbonate $C(OC_4H_9)_4$, isobutyl orthocarbonate $C(O-i-C_4H_9)_4$, hexyl orthocarbonate $C(OC_6H_{13})_4$, and octyl orthocarbonate $C(OC_8H_{17})_4$.

(2) Orthoesters of the general formula $X'C(OR')_3$ and their derivatives. Specific examples thereof, when X' stands for a hydrogen atom, include methyl orthoformate $HC(OCH_3)_3$, ethyl orthoformate $HC(OC_2H_5)_3$, propyl orthoformate $HC(OC_3H_7)_3$, butyl orthoformate $HC(OC_4H_9)_3$, isobutyl orthoformate $HC(O-i-C_4H_9)_3$, hexyl orthoformate $HC(OC_6H_{13})_3$, octyl orthoformate $HC(OC_8H_{17})_3$, and phenyl orthoformate $HC(OC_6H_5)_3$. Examples of compounds when X' stands for an alkyl, aryl or cycloalkyl group, are methyl orthoacetate $CH_3C(OCH_3)_3$, ethyl orthoacetate $CH_3C(OC_2H_5)_3$, methyl orthopropionate $CH_3CH_2C(OCH_3)_3$, ethyl orthopropionate $CH_3CH_2C(OC_2H_5)_3$, and compounds represented by the formulas $C_6H_{11}C(OC_2H_5)_3$, $C_6H_5C(OC_2H_5)_3$, $C_6H_5C(OCH_3)_3$, $C_6H_5C(OC_3H_7)_3$, $C_7H_8C(OC_2H_5)_3$ and $C_8H_{11}C(OC_2H_5)_3$. Examples of compounds in which X' stands for an alkyl, aryl or cycloalkyl group having a hydrogen atom replaced by a halogen atom, include ethyl orthobromoacetate $CH_2BrC(OC_2H_5)_3$, ethyl orthochloroacetate $CH_2ClC(OC_2H_5)_3$, ethyl ortho alpha-bromopropionate $CH_3CHBrC(OC_2H_5)_3$ and ethyl ortho alpha-chloropropionate $CH_3CHClC(OC_2H_5)_3$. If X' stands for a halogen atom, examples of the compounds include methyl orthochloroformate $ClC(OCH_3)_3$, ethyl orthochloroformate $ClC(OC_2H_5)_3$, propyl orthochloroformate $ClC(OC_3H_7)_3$, isobutyl orthochloroformate $ClC(O-i-C_4H_9)_3$, octyl orthochloroformate $ClC(OC_8H_{17})_3$, phenyl orthochloroformate $ClC(OC_6H_5)_3$, and ethyl orthobromoformate $BrC(OC_2H_5)_3$.

(3) Acetals of the general formula $X'_2C(OR')_2$ and their derivatives. More specifically, they include ethylidene dimethyl ether $CH_3CH(OCH_3)_2$, ethylidene diethyl ether $CH_3CH(OC_2H_5)_2$, methylal $CH_2(OCH_3)_2$, methylene diethyl ether $CH_2(OC_2H_5)_2$, monochloroacetal $CH_2ClCH(OC_2H_5)_2$, dichloroacetal $CHCl_2CH(OC_2H_5)_2$, trichloroacetal $CCl_3CH(OC_2H_5)_2$, monobromoacetal $CH_2BrCH(OC_2H_5)_2$, monoiodoacetal $CH_2ICH(OC_2H_5)_2$, and benzaldehyde diethyl acetal $C_6H_5CH(OC_2H_5)_2$.

It is preferable to use orthoformic esters, particularly alkyl esters having 1 to 8 carbon atoms, such as methyl orthoformate, ethyl orthoformate and butyl orthoformate.

The magnesium-containing solid can be obtained by contacting an alkoxy compound, metallic magnesium and a halogenated hydrocarbon with one another. Any method may be used for contacting them without lamination in particular. It is, for example, possible to adopt any of the following methods:

(1) Contacting them with one another simultaneously;

(2) Contacting metallic magnesium and a halogenated hydrocarbon with each other, and then, contacting them with an alkoxy compound, or contacting with an alkoxy compound a compound obtained by contacting metallic magnesium and a halogenated hydrocarbon, for example, any compound known as a Grignard reagent, including $ClMgCH_3$, $ClMgC_2H_5$, $ClMgC_3H_7$, $ClMgC_4H_9$, $ClMgi-C_4H_9$, $ClMgC_6H_{13}$, $ClMgC_8H_{17}$, $BrMgC_2H_5$, $BrMgC_4H_9$, $BrMgi-C_4H_9$, $IMgC_4H_9$, $ClMgC_6H_5$ and $BrMgC_6H_5$;

(3) Adding a solution of a halogenated hydrocarbon into a solution of an alkoxy compound in which metallic magnesium is suspended; or (4) Contacting an alkoxy compound with a halogenated hydrocarbon, and them, adding metallic magnesium. The method as set forth in (3) is, among others, preferred.

It is desirable to employ an alkoxy compound and metallic magnesium in such a proportion that the alkoxy compound may contain at least one, and preferably 3 to 5, OR' groups per magnesium atom in the metallic magnesium. In other words, it is desirable to employ at least 0.5 mol, and preferably 1.5 to 2.5 mols, of an alkoxy compound, if it is a compound of the formula $X'_2C(OR')_2$, or at least $\frac{1}{3}$ mol, and preferably 1 to 5/3 mols, of an alkoxy compound if it is a compound of the formula $X'C(OR')_3$, per gram atom of magnesium. It is desirable to use 1 to 2 mols of a halogenated hydrocarbon per gram atom of magnesium.

The contacting reaction may be carried out under stirring at a temperature at 40° C. to 250° C., preferably 60° C. to 120° C., in one to 10 hours. The reaction can be caused to take place in the presence of an inert hydrocarbon used for drying magnesium, for instance, an aliphatic, alicyclic or aromatic hydrocarbon having 6 to 8 carbon atoms. It is, however, not desirable to use any oxygen-containing compound, such as ether or alcohol.

In order to promote the reaction, it is possible to use iodine, or an inorganic halide such as alkyl iodide, calcium chloride, copper chloride, manganese chloride, or a hydrogen halide.

The solid obtained as the reaction product is separated from the reaction system, and washed with an inert hydrocarbon if required, and dried if required, to yield a magnesium-containing solid according to this invention.

The magnesium-containing solid thus obtained is composed of highly uniform particles having a specific surface area of at least 200 m²/g when determined by the BET method, and a pore volume of at least 0.15 cc/g. The solid contains 5 to 25% by weight of magnesium atoms, and 3 to 70% by weight of halogen atoms, while the balance is, for example, an organic compound.

The magnesium-containing solid is thereafter contacted with an electron donative compound and treated with a hydrogen halide to yield a magnesium-containing solid which exhibits excellent properties when used as a carrier for an olefin polymerization catalyst.

As electron donative compounds, it is possible to use a carboxylic acid, a derivative thereof, an alcohol, an ether, a ketone, an amine, an amide, a nitrile, an aldehyde, an alcoholate, a compound of phosphorus, arsenic or antimony bonded to an organic group by carbon or oxygen, a phosphamide, a thioether, a thioester, or a carbonic acid ester. It is preferable to use a carboxylic acid, or a derivative thereof.

It is generally suitable to use a saturated or unsaturated aliphatic, alicyclic or aromatic carboxylic acid having 1 to 15 carbon atoms, or a derivative thereof.

Examples of suitable carboxylic acids include saturated aliphatic carboxylic acids such as formic acid, acetic acid, propionic acid, butyric acid, isobutyric acid, valeric acid, isovaleric acid, trimethylacetic acid, carpoic acid, capric acid and tartaric acid, unsaturated aliphatic acids such as acrylic acid, methacrylic acid, pentenoic acid, hexenoic acid, methylpentenoic acid, ethylcrotonic acid and heptenoic acid, alicyclic carboxylic acids such as cyclohexanecarboxylic acid, cis-4-methylcyclohexanecarboxylic acid, cyclohexenecarboxylic acids, cis-1,2-cyclohexanedicarboxylic acid, cyclohexene-1,2-dicarboxylic acids and cyclohexene-1,4-dicarboxylic acids, aromatic monocarboxylic acids such as benzoic acid, p-toluic acid, p-ethylbenzoic acid and p-methoxybenzoic acid, and aromatic dicarboxylic acids such as phthalic acid.

Examples of suitable derivatives include the acid anhydrides, acid halides, esters and amides of the carboxylic acids as hereinabove listed. More specifically, they include acid anhydrides, acid chlorides, acid bromides, acid iodides, saturated or unsaturated alcohol ester, such as methyl, ethyl, butyl or allyl esters, and acid amides, of those carboxylic acids.

It is particularly preferable to use aromatic carboxylic acids, especially benzoic acid, p-toluic acid or p-methoxybenzoic acid, or their derivatives, such as acid anhydrides, acid halides or esters.

Any customary method may be employed for contacting a magnesium-containing solid with a carboxylic acid or a derivative thereof, but it is particularly appropriate to mix the magnesium-containing solid or a suspension thereof in an inert solvent of the type hereinbefore listed with a carboxylic acid or a derivative thereof, or a solution or suspension thereof in any such inert solvent. The contact reaction may be carried out at a temperature of $-10°$ C. to 200° C., preferably 20° C. to 100° C. for 10 minutes to 20 hours, preferably for 0.5 to 10 hours. It is desirable to employ 0.01 to 20 mols, particularly 0.1 to 5 mols of a carboxylic acid or a derivative thereof per gram atom of magnesium in the solid.

After the magnesium-containing solid has been reacted with the electron donative compound it is contacted with a halogen halide either in the reaction system in which the electron donative treated magnesium-containing solid was prepared or the solid is separated from the reaction system, washed, if required, with an inert solvent of the type hereinbefore listed, and dried if required.

The hydrogen halides are HCl, HBr and HI, preferably HCl. The electron-donative treated magnesium-containing solid is contacted with the hydrogen halide, such as hydrogen chloride preferably in the gaseous form. The solid can be contacted with hydrogen chloride if hydrogen chloride gas is blown into a suspension of the solid in an inert hydrocarbon such as hexane, heptane, cyclohexane, benzene or toluene, and/or a halogenated hydrocarbon such as carbon tetrachloride or 1,2-dichloroethane, while it is being stirred, after the solid has been separated from the carboxylic acid or derivative thereof, and washed. Alternatively, it is possible to blow hydrogen chloride gas directly into a suspension of the carboxylic acid or derivative thereof in which the solid is suspended, while the suspension is being stirred.

It is suitable to employ 0.1 to 10 mols of hydrogen chloride per gram atom of magnesium in the solid. The contact of the solid with hydrogen chloride is preferably carried out at a temperature of $-15°$ C. to 25° C., particularly $-5°$ C. to 5° C., for 0.5 to 10 hours, particularly for one to three hours.

After hydrogen chloride has been blown, it is desirable to raise the contact temperature to somewhere in the range of 30° C. to 100° C. and heat the suspension for 0.5 to 10 hours in an inert gas atmosphere for removing hydrogen chloride. Although it is satisfactory to conduct the heating in the presence of an inert gas, it is also possible to blow an inert gas, such as nitrogen, forcibly.

The magnesium-containing solid thus treated with hydrogen chloride is separated from the reaction system, and washed, if required, with an inert solvent of the type hereinbefore listed, and dried if required, to provide a magnesium-containing solid according to this invention.

According to a second aspect of this invention, there is provided a catalyst for polymerization of olefins comprising a titanium compound supported on a magnesium-containing solid obtained by contacting the reaction product of (1):

(A) metallic magnesium;
(B) a halogenated hydrocarbon of the general formula RX in which R stands for an alkyl, aryl or cycloalkyl group having 1 to 20 carbon atoms, and X stands for a halogen atom; and
(C) an alkoxy compound of the general formula $X'_mC(OR')_{4-m}$ in which X' stands for a hydrogen or halogen atom, or an alkyl, aryl or cycloalkyl group having 1 to 10 carbon atoms, R' stands for an alkyl, aryl or cycloalkyl group having 1 to 20 carbon atoms, and m is 0, 1 or 2, with (2) an electron donative compound and hydrogen halide.

In other words, there is provided a catalyst for polymerization of olefins comprising a titanium compound supported on a magnesium-containing solid obtained according to the first aspect of this invention.

Any titanium compound usually used for forming a catalyst for polymerization of olefins may be used for this invention, but it is preferable to employ a halide of trivalent or tetravalent titanium, or an organic compound of titanium, such as a titanium halide, alkoxytitanium or an alkoxytitanium halide. More specifically, it is suitable to use, for example, titanium tetrachloride, titanium tetrabromide, trichloroethoxytitanium, trichlorobutoxytitanium, dichlorodiethoxytitanium, dichlorodiphenoxytitanium, chlorotriethoxytitanium, chlorotributoxytitanium, tetrabutoxytitanium, or titanium trichloride. It is preferable to use, among others, titanium tetrachloride, trichloroethoxytitanium, dichlorodibutoxytitanium, dichlorodiphenoxytitanium, or other tetravalent titanium halides. Titanium tetrachloride is the most preferable.

Although any customary method may be used for applying a titanium compound to a magnesium-containing solid, it is particularly suitable to mix the solid or a suspension thereof in an inert solvent, for example, a hydrocarbon such as hexane, heptane, octane, cyclohexane, benzene, toluene or xylene, with the titanium compound or a solution or suspension thereof in any such inert solvent, and maintain them in contact with each other at a temperature of 0° C. to 200° C. for five minutes to 10 hours, and preferably at a temperature of 30° C. to 120° C. for 20 minutes to five hours.

It is desirable to employ at least 0.01, and preferably 0.1 to 100, gram atoms of any such titanium compound per gram atom of magnesium in the solid. It is not necessary to finish application of the titanium compound at one time, but it is all right to repeat it twice or more times.

The magnesium-containing solid on which the titanium compound has been supported as hereinabove described is separated from the reaction system, and washed, if required, with an inert solvent such as hexane, heptane, octane, cyclohexane, benzene, toluene, xylene or kerosene, and dried if required, to provide a catalyst according to this invention.

The catalyst of this invention together with the organoaluminum co-catalyst provides an olefin polymerization catalyst of high activity.

It is possible to use any organic aluminum compound that is usually used as a promoter for a Ziegler catalyst. For example, it is possible to use any organic aluminum compound of the general formula $R_nAlX_{3-n}$ with which the magnesium-containing solid has been contacted as hereinabove described.

It is, however, preferable to use trialkylaluminum, particularly triethylaluminum or triisobutylaluminum. Trialkylaluminum may be used alone, or with any other organic aluminum compound, such as diethylaluminum chloride, ethylaluminum dichloride, ethylaluminum sesquichloride, diethylaluminum ethoxide and diethylaluminum hydride, which are all easily available in industry, or a mixture or complex compound thereof.

It is further possible to employ an electron donative compound in combination in order to obtain a polymer having improved stereoregularity. For this purpose, it is satisfactory to use any of the electron donative compounds hereinbefore listed for use in the manufacture of the magnesiumcontaining solid, though it is, of course, possible to employ any other compound. It is, however, preferable to use an alkyl ester of an aromatic carboxylic acid, particularly an alkyl ester of benzoic acid, or a nuclear substitution product of benzoic acid, such as p-methylbenzoic acid or p-methoxybenzoic acid, having 1 to 8 carbon atoms. The electron donative compound may be incorporated either when the organic aluminum compound is used in combination with the catalyst, or after it has been contacted with the organic aluminum compound.

It is desirable to employ 1 to 2,000 and preferably 10 to 500, mols of any such organic aluminum compound per gram atom of titanium in the catalyst of this invention.

When both the organic aluminum compound and the electron donative compound are employed, it is possible to employ 0.1 to 50, and preferably 1 to 25, gram atoms of aluminum in the organic aluminum compound per mol of the electron donative compound.

The homopolymerization and copolymerization of olefins may be carried out in the same way when the catalyst of this invention is used, as when an ordinary Ziegler catalyst is used. The catalyst of this invention is, therefore, very useful for the homopolymerization of olefins, and the random or block copolymerization of different olefins. More specifically, the catalyst of this invention is useful for polymerizing ethylene, and alpha-olefins such as propylene, butene-1, pentene-1, 4-methyl-pentene-1, hexene-1 and octene-1.

The reaction for polymerization may be carried out either in the vapor phase, or in the liquid phase. The liquid phase polymerization may be carried out in an inert hydrocarbon such as normal butane, isobutane, normal pentane, isopentane, hexane, heptane, octane, cyclohexane, benzene, toluene or xylene, or a liquid monomer. The temperature for polymerization is in the range of $-80°$ C. to $150°$ C., preferably $40°$ C. to $120°$ C., and the polymerization pressure may, for example, be in the range of 1 to 60 atm. It is possible to adjust the molecular weight of the polymer to be obtained, if polymerization is carried out in the presence of hydrogen, or any other known agent for controlling the molecular weight. The copolymerization of olefins may be carried out by employing up to 30%, and preferably 0.3 to 15%, by weight of one olefin to the other. The catalyst of this invention is useful for either continuous or batch polymerization under ordinary conditions.

The magnesium-containing solid of this invention is composed of uniform spherical particles having an average diameter which is generally variable between 10 to 40 microns, and having a narrow range of particle size distribution. The coefficient of variation in the particle size distribution of the magnesium-containing solid of this invention, which is obtained by dividing the standard deviation of its particle size distribution by its average particle diameter, it is not higher than 0.3. The magnesium-containing solid of this invention has a large surface area, and the olefin polymerization catalyst comprising a titanium compound supported on the solid has a specific surface area of at least 200 $m^2/g$; and a pore volume exceeding 0.3 cc/g. Thus, the magnesium-containing solid of this invention provides a catalyst having a high degree of activity for polymerization of olefins, and which makes it possible to manufacture a polymer composed of uniform particles.

The invention will now be described more specifically with reference to examples thereof, and applied examples in which the products of this invention were used for various polymerization purposes. It is to be understood that these examples do not limit the scope of this invention in any way. In the examples, and applied examples, the percentages (%) are shown by weight unless otherwise noted.

The melt index (MI) of an ethylene polymer was determined by applying a load of 2.16 kg at a temperature of $190°$ C. in accordance with the provisions of ASTM D1238. The flow ratio (FR) was obtained by dividing the melt index determined at a temperature of $190°$ C. and a load of 21.6 kg (HLMI) by the melt index at $190°$ C. and 2.16 kg (MI). It provides a measure of the molecular weight distribution of a polymer.

The melt flow rate (MFR) of a propylene polymer was determined in accordance with the provisions of ASTM D1238. The heptane insoluble (HI) showing the percentage of the crystalline portion of a polymer represents the residue obtained after extraction for six hours by a Soxhlet extraction apparatus with boiling n-heptane.

The catalytic activity Kc is expressed by the quantity (g) of polymer formation per gram of the catalyst, and Kt by the quantity (kg) of polymer formation per gram of titanium in the catalyst. The specific activity of the catalyst is expressed by the quantity (g) of polymer formation per gram of the catalyst, hour of polymerization, and unit partial pressure ($kg/cm^2$) of the monomers during polymerization. The bulk density was determined in accordance with Method A specified in ASTM D1895-69. The particle size distribution of the polymer was determined by a W. S. Tyler standard sieve.

The specific surface area (SA), pore volume (PV) and mean pore radium (MPR) of the magnesium-containing solid and the catalyst were determined by a Carlo Erba's SORPTOMATIC 1810 apparatus. The particle size distribution of the catalyst was determined by a Seishin Kigyo's SKN 500 light transmission type apparatus.

EXAMPLE 1

Preparation of a Magnesium-Containing Solid

A one-liter capacity reactor having a reflux condenser was fed, in the presence of nitrogen gas, with 12.8 g (0.53 mol) of chips of metallic magnesium having a purity of 99.5% and an average particle diameter of 1.6 mm, and 250 ml of n-hexane, and they were stirred at $68°$ C. for one hour. Then, the metallic magnesium was taken out of the reactor, and vacuum dried at $68°$ C., whereby preactivated metallic magnesium was obtained.

A suspension of the metallic magnesium was prepared by adding 88 ml (0.53 mol) of ethyl orthoformate and 0.2 ml of a promoter composed of a methyl iodide solution containing 10% of iodine, and maintained at $55°$ C. Then, 5 ml of a solution containing 80 ml (0.8 mol) of n-butyl chloride in 100 ml of n-hexane were dropped into the suspension, and after the suspension was stirred for 50 minutes, the remaining solution was dropped into the suspension over a period of 80 minutes. The reaction was continued at $70°$ C. for four hours under stirring, whereby a solid reaction product was obtained.

The reaction product was washed six times with 300 ml each of n-hexane at $50°$ C., and vacuum dried at $60°$ C. for one hour, whereby 55.6 g of a magnesium-containing solid in the form of a white powder were obtained. The solid was found to contain 22.5% of magnesium and 34.0% of chlorine. It had a specific surface area (SA) of 230 $m^2/g$, a pore volume (PV) of 0.15 cc/g, and a mean pore radius (MPR) of 15 Å.

Preparation of a Catalyst

Titanium Tetrachloride Treatment

A 300 ml capacity reactor having a reflux condenser was fed, in the presence of nitrogen gas, with 5.5 g of the magnesium-containing solid prepared as hereinabove described, and 50 ml of titanium tetrachloride. After they had been stirred for three hours at $90°$ C., the excess titanium tetrachloride was removed. Then a solid substance was separated by filtration at $90°$ C., washed six times with 200 ml each of n-hexane at $65°$ C., and dried at $50°$ C. for one hour under reduced pressure to yield 6.9 g of a catalyst containing 6.5% of titanium, and having a specific surface area of 396 $m^2/g$ and a pore volume of 0.313 cc/g.

EXAMPLE 2

Preparation of a Catalyst

Benzoic Anhydride Treatment 8.0 g of the magnesium-containing solid obtained in Example 1, 150 ml of n-hexane, and 3.0 g (13.3 mmol, or 0.2 mol per gram atom of magnesium in the solid) of benzoic anhydride were fed into a 300 ml capacity reactor having a reflux condenser in a nitrogen gas atmosphere to prepare a suspension of the solid. The suspension was subjected to contact reaction at 70° C. for two hours. The resulting solid substance was separated, and washed three times with 150 ml each of n-hexane at 65° C.

Hydrogen Chloride Treatment

A suspension of the solid substance was prepared by adding 150 ml of n-hexane. Two mols of anhydrous hydrogen chloride per gram atom of magnesium in the solid were blown into the suspension at 0° C. over a period of two hours, while the suspension was being stirred. After the introduction of hydrogen chloride gas had been discontinued, the suspension was stirred for one hour at 60° C. Then, the solid substance was separated, and washed six times with 150 ml each of n-hexane at 65° C.

Titanium Tetrachloride Treatment

The solid substance was contacted with 120 ml of titanium tetrachloride at 120° C. for two hours, and then, the excess titanium tetrachloride was removed. Then, the solid substance was separated by filtration at 120° C., washed ten times with 150 ml each of n-hexane at 65° C., and dried at 50° C. for one hour under reduced pressure, whereby 7.7 g of a catalyst having a titanium content of 4.1%, a S.A. of 359 m$^2$/g and a P.V. of 0.33 cc/g. The particle size distribution of this catalyst was as follows:

| | |
|---|---|
| 100 microns or above | 0.5% |
| 80 microns or above, but below 100 microns | 1.5% |
| 60 microns or above, but below 80 microns | 4.5% |
| 50 microns or above, but below 60 microns | 6.0% |
| 40 microns or above, but below 50 microns | 23.5% |
| 30 microns or above, but below 40 microns | 49.5% |
| 25 microns or above, but below 30 microns | 6.5% |
| 20 microns or above, but below 25 microns | 5.0% |
| 15 microns or above, but below 20 microns | 2.8% |
| Below 15 microns | 0.2% |

EXAMPLE 3

Preparation of a Catalyst

Benzoic Acid Treatment 9.4 g of the magnesium-containing solid obtained in Example 1, 130 ml of n-hexane, and 3.3 g (27.0 mmol, or 0.33 mol per gram atom of magnesium in the solid) of benzoic acid were subjected to contact reaction at 70° C. for two hours as described in Example 2. The resulting solid substance was separated, and washed with n-hexane at 65° C.

Hydrogen Chloride Treatment

A suspension of the solid substance was prepared by adding 150 ml of n-hexane. Three mols of anhydrous hydrogen chloride gas per gram atom of magnesium in the magnesium-containing solid were blown into the suspension at −2° C. over a period of three hours, while the suspension was being stirred. After the introduction of hydrogen chloride gas had been discontinued, the suspension was stirred for 1.5 hours at 65° C. The solid substance was separated, and washed six times with 150 ml each of n-hexane at 65° C.

Titanium Tetrachloride Treatment

The solid substance was treated with titanium tetrachloride as described in Example 14, whereby a catalyst having a titanium content of 2.7%, a S.A. of 365 m$^2$/g and a P.V. of 0.34 cc/g.

EXAMPLE 4

Preparation of a Catalyst

Benzoyl Chloride Treatment 9.2 g of the magnesium-containing solid obtained in Example 1, 170 ml of n-hexane, and 3.2 ml (27.8 mmol, or 0.33 mol per gram atom of magnesium in the solid) of benzoyl chloride were subjected to contact reaction at 70° C. for two hours as described in Example 2. The resulting solid substance was repeated, and washed with n-hexane at 65° C.

Hydrogen Chloride Treatment

A suspension of the solid substance was prepared by adding 150 ml of n-hexane. 1.5 mols of anhydrous hydrogen chloride gas per gram atom of magnesium in the magnesium-containing solid were blown into the suspension at 2° C. over a period of 1.5 hours, while the suspension being stirred. After the introduction of hydrogen chloride gas had been discontinued, the suspension was stirred for one hour at 60° C. The solid substance was separated, and washed six times with 150 ml each of n-hexane at 65° C.

Titanium Tetrachloride Treatment

The solid substance was treated with titanium tetrachloride as described in Example 2, whereby a catalyst having a titanium content of 2.1%, a S.A. of 349 m$^2$/g and a P.V. of 0.35 cc/g.

APPLIED EXAMPLE 5

Polymerization of Propylene

A one-liter capacity stainless steel (SUS 32) autoclave equipped with a stirrer was fed with a mixture of 71.8 mg of the catalyst obtained in Example 2, 11.0 ml of a n-heptane solution containing 160 gram atoms of aluminum per gram atom of titanium in the catalyst, and 0.46 ml of ethyl p-methoxybenzoate, or 0.29 mol thereof per gram atom of aluminum in triethylaluminum, after the mixture had been left at rest for five minutes. After 0.6 liter of hydrogen gas and 0.8 liter of liquified propylene were injected, the temperature of the reaction system was raised to 68° C., and polymerization of propylene was conducted for 30 minutes, while the hydrogen gas served as a molecular weight controlling agent. After the polymerization had been completed, the unreacted propylene was removed, and there were obtained 327 g of a white, semitransparent polypropylene powder having a heptane insoluble content (HI) of 94.0, a melt flow rate (MFR) of 4.7 and a bulk density of 0.51 g/cm$^3$. The Kc value of the catalyst was 4,500, and its Kt value was 111. The particle size distribution of the polypropylene thus obtained was as follows:

| | |
|---|---|
| 1,680 microns or above | 0.2% |
| 840 microns or above, but below 1,680 microns | 25.8% |
| 590 microns or above, but below 840 microns | 60.5% |
| 500 microns or above, but below 590 microns | 6.0% |
| 420 microns or above, but below 500 microns | 4.5% |
| 350 microns or above, but below 420 microns | 2.8% |
| Below 350 microns | 0.2% |

APPLIED EXAMPLES 6 AND 7

Polymerization of Propylene

The procedures of Applied Example 5 were repeated for polymerization of propylene, except that the catalysts obtained in Examples 3 and 4 were employed. The results for Example 6 obtained 164 g of a white, transparent polypropylene powder having a heptane insoluble content (HI) of 93.8%, a melt flow rate (MFR) of 3.2 g/10 min., a bulk density of 0.49 g/cm$^3$, a Kc of 2700 and Kt of 100. The results for Example 7 obtained 261 g of a white, semitransparent polypropylene powder having a HI of 95.7%, a MFR of 5.2 g/10 min., a bulk density of 0.49 g/cm$^3$, a Kc of 3080 and a Kt of 147.

APPLIED EXAMPLE 8

Polymerization of Propylene

The procedures of Applied Example 5 were repeated for polymerization of propylene, except for the use of 153 mg of the catalyst obtained in Example 1, and triethylaluminum in the quantity containing 60 gram atoms of aluminum per gram atom of titanium in the catalyst. The results obtained a Kc of 530, a Kt of 7, a HI of 80.2% and a bulk density of 0.25 g/cm$^3$.

What is claimed is:

1. A magnesium-containing solid obtained by contacting the reaction product of (1):
    (a) metallic magnesium;
    (b) a halogenated hydrocarbon of the general formula RX in which R stands for an alkyl, aryl or cycloalkyl group having 1 to 20 carbon atoms, and X stands for a halogen atom; and
    (c) an alkoxy compound of the general formula X'$_m$C(OR')$_{4-m}$ in which X' stands for a hydrogen or halogen atom, or an alkyl, aryl or cycloalkyl group having 1 to 10 carbon atoms, R' stands for an alkyl, or cycloalkyl group having 1 to 20 carbon atoms, and m is 0, 1 or 2, with (2) an electron donative compound and hydrogen halide.

2. The magnesium-containing solid of claim 1 wherein R is an alkyl or cycloalkyl group having 1 to 8 carbon atoms, m is 1, R' is an alkyl group having 1 to 8 carbon atoms, the electron donative compound is selected from the group consisting of carboxylic acids, carboxylic acid anhydrides, carboxylic acid esters, carboxylic acid halides and carboxylic acid amides, alcohols, ethers, ketones, amines, amides, nitriles, aldehydes, organo compounds of phosphorous, arsenic and antimony, thioethers, thioesters, or carbonic acid esters.

3. The magnesium-containing solid of claim 2 wherein the halogenated hydrocarbon is n-butyl chloride, the alkoxy compound is one of ethyl orthoformate or methyl orthoformate and the electron donative compound is a saturated or unsaturated aliphatic, alicyclic or aromatic carboxylic acid having 1 to 15 carbon atoms or a derivative thereof.

4. The magnesium-containing solid of claim 3 wherein the electron donative compound is one of benzoic acid, p-toluic acid or p-methoxybenzoic acid or their acid anhydrides, acid halides or esters.

5. A catalyst component for polymerization of olefins comprising a titanium compound supported on the magnesium-containing solid of claim 1.

6. A catalyst component for the polymerization of olefins comprising a titanium compound supported on a magnesium-containing solid of claim 2.

7. A catalyst component for the polymerization of olefins comprising a titanium compound supported on a magnesium-containing solid of claim 3.

8. A catalyst component for the polymerization of olefins comprising a titanium compound supported on a magnesium-containing solid of claim 4.

9. A catalyst component of claim 5 wherein the titanium compound is a trivalent or tetravalent titanium compound selected from titanium halides, alkoxy titanium compounds or alkoxy titanium halides.

10. A catalyst component of claim 9 wherein the titanium compound can be one of titanium tetrachloride, titanium tetrabromide, trichloroethoxy titanium, trichlorobutoxy titanium, dichlorodiethoxy titanium, dichlorodiphenoxy titanium, chlorotriethoxy titanium, chlorotributoxy titanium, tetrabutoxy titanium, or titanium chloride.

11. A catalyst component of claim 10 wherein the titanium compound is one of titanium tetrachloride, trichloroethoxy titanium, dichlorodibutoxy titanium, dichlorodiphenoxy titanium.

12. A catalyst system for the polymerization of olefins comprising the catalyst component of claim 5 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

13. A catalyst system for the polymerization of olefins comprising the catalyst component of claim 6 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

14. A catalyst system for the polymerization of olefins comprising the catalyst component of claim 7 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

15. A catalyst system for the polymerization of olefins comprising the catalyst component of claim 8 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

16. A catalyst system for the polymerization of olefins comprising the catalyst component of claim 9 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

17. A catalyst system for the polymerization of olefins comprising the catalyst component of claim 10 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

18. A catalyst system for the polymerization of olefins comprising the catalyst component of claim 11 and an organoaluminum compound represented by the general formula $R_nAlX_{3-n}$ wherein R stands for an alkyl or aryl group having 1 to 18 carbon atoms, X stands for halogen or hydrogen atom and n is a number from 1 to 3.

* * * * *